United States Patent [19]

Terry, Sr.

[11] Patent Number: 5,375,865
[45] Date of Patent: Dec. 27, 1994

[54] MULTIPLE RIDER BICYCLE DRIVE LINE SYSTEM INCLUDING MULTIPLE CONTINUOUSLY VARIABLE TRANSMISSIONS

[76] Inventor: Maurice C. Terry, Sr., 3834 148th Ave. Northeast, Redmond, Wash. 98052

[21] Appl. No.: 122,756
[22] Filed: Sep. 16, 1993
[51] Int. Cl.⁵ .................. B62M 1/02; B62M 9/04
[52] U.S. Cl. .................. 280/231; 280/238; 280/261
[58] Field of Search .............. 280/230, 231, 222, 273, 280/261, 238, 304.3, 210, 232, 263, 239, 260

[56] References Cited

U.S. PATENT DOCUMENTS

| 603,497 | 5/1898 | Caswell | 280/231 |
|---|---|---|---|
| 4,502,705 | 3/1985 | Weaver | 780/263 X |
| 4,936,597 | 6/1990 | Hartmann | 280/231 |
| 4,955,247 | 9/1990 | Marshall | 280/238 X |
| 5,135,246 | 8/1992 | Montague | 280/231 |
| 5,209,507 | 5/1993 | Domenge | 280/231 |

FOREIGN PATENT DOCUMENTS

| 0016731 | of 1895 | United Kingdom | 280/231 |
|---|---|---|---|
| 0464959 | 4/1936 | United Kingdom | 280/231 |

Primary Examiner—Eric D. Culbreth
Assistant Examiner—F. Zeender
Attorney, Agent, or Firm—Curtis, Morris & Safford

[57] ABSTRACT

A tandem bicycle drive train system includes a continuously variable transmission installed around each crank spindle driving an input crank spindle journalled in a continuously variable transmission unit whose output is connected to a drive sprocket which is journalled between the input crank spindle and the transmission unit. A manual ratio control assembly is suitably mounted to the frame member and positioned around the input crank spindle and suitably coupled with the transmission unit in a manner that provides a smooth, continuously variable change in the input to output rotational speed ratio. Each rider's ratio control is preferably coupled to a manual twist-grip on each rider's handle bar and can be adjusted independent of the other rider's control. The front unit output drives a single sprocket which drives one of two sprockets mounted on the rear unit. A second sprocket on the rear unit drives the rear wheel. Thus, the drive line is at all times a single drive line with two or more variable speed torque inputs from the transmissions around each input crank spindle. Each unit is suitably mounted within an oversize input pedal spindle housing in such manner as to permit sealing from outside contamination.

3 Claims, 1 Drawing Sheet

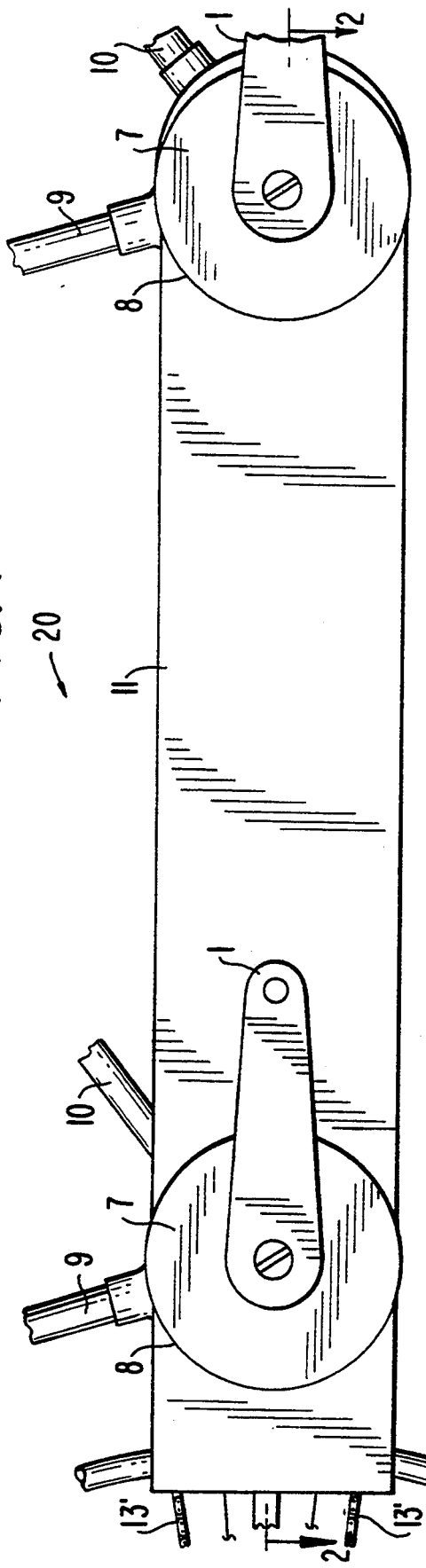
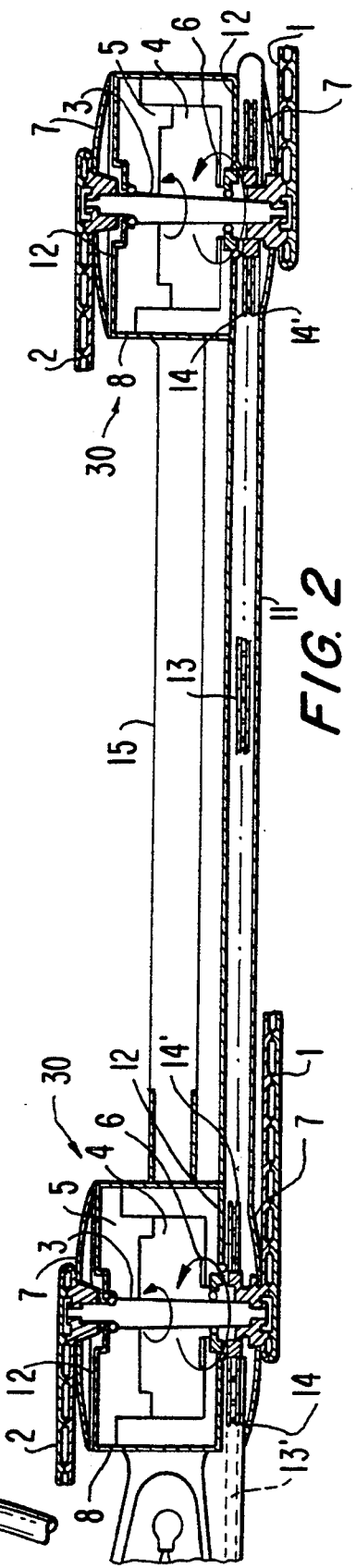
FIG. 1
FIG. 2

MULTIPLE RIDER BICYCLE DRIVE LINE SYSTEM INCLUDING MULTIPLE CONTINUOUSLY VARIABLE TRANSMISSIONS

FIELD OF THE INVENTION

The present invention relates to multiple rider pedal powered vehicles, in particular, tandem bicycles and the like, and drive line systems therefor.

BACKGROUND OF THE INVENTION

Much research and testing has been accomplished to help alleviate the rider problems associated with more than one rider riding the same two-wheeled vehicle, commonly known as a tandem bicycle. There are in use two person, three person, and four person tandem bicycles. As conventionally built, the pedal sets for each rider drive a common drive line, commonly a chain, at the same speed. Thus, although there may be provision for gear ratio change at the rear wheel, the multiple pedal sets of the multiple riders are mechanically linked together at all times and must rotate at the same relative spinning rpm rate in lock-step.

The problems with current drive line systems for tandem bicycles have been the same since the origins of tandem bicycles. The requirements for each rider to match his optimum pedal spinning rpm rate, the amounts of torque each rider puts into the drive line, the inability of one rider to ride differently than the other(s) and how each rider rests certain muscle groups during the ride have always been a compromise at best.

OBJECTS OF THE INVENTION

It is an object of the present invention to provide a drive line system which overcomes these problems of the prior art.

In particular, it is an object of the present invention to provide a drive line for two, three or four person bicycles, or other multiple rider, pedal powered vehicles, that provides each rider with the ability to independently put his/her torque into a common drive line driving a drive wheel.

It is a particular object of the present invention to provide a tandem bicycle having a continuously variable transmission associated with the crank spindle for each rider.

It is another object of the present invention to provide a tandem bicycle having a continuously variable transmission mounted around the crank spindle for each rider which can be independently adjusted for speed ratio relative to a common drive line.

It is another object of the present invention to provide a multiple continuously variable transmission drive line system for tandem bicycles which is compact, robust, and reliable.

SUMMARY OF THE INVENTION

These and other objects of the present invention are accomplished in a multiple rider pedal driven vehicle comprising a first pedal crank and crank spindle for a first rider, a first independently controllable continuously variable transmission mounted around the first crank spindle, a second pedal crank and crank spindle for a second rider, and a second independently controllable continuously variable transmission mounted around the second crank spindle, each of the first and second independently controllable continuously variable transmissions including an output driving a common drive line.

These and other objects, features and advantages of the present invention will be apparent to those skilled in the art upon review of the following description and drawings, wherein:

BRIEF DESCRIPTION OF THE DRAWINGS

FIG. 1 is an overall elevation view of the exterior of a drive line system for a tandem bicycle in accordance with a preferred embodiment of the present invention; and FIG. 2 is a sectional view of the drive line system depicted in FIG. 1, taken along the line 2—2 of FIG. 1.

DETAILED DESCRIPTION

Referring to the drawings in detail, and initially to FIGS. 1 and 2 thereof, a tandem bicycle drive line system 20 for two riders in accordance with the present invention is depicted, the front rider position being to the right of FIGS. 1 and 2 and the rear rider position being to the left. Although a tandem bicycle adapted for two riders is depicted, it is to be understood that the invention is applicable to tandem bicycles or other pedal driven vehicles having any number of riders.

Rider input torque is supplied to the drive line system 10 by each rider through each rider's pedal crank set, including pedal cranks 1 and 2, which are connected to respective input crank spindles 3. In conventional prior art tandem bicycles, the respective crank spindles would each include a sprocket for directly driving a drive chain for driving the rear wheel. Thus, each rider would, of necessity, need to pedal either at the same rate, or at a present relative rate, one to the other(s). However, in the present invention, each crank spindle 3 inputs to a continuously variable transmission unit 30 associated with that crank spindle, which in turn outputs to a common drive line, thus permitting the pedalling rate of each rider to be varied at any time independently of the other.

A variety of designs of continuously variable transmissions are known and are useable in the present invention. One such continuously variable transmission is disclosed in U.S. Pat. No. 4,909,101, issued Mar. 20, 1990, the contents of which are hereby incorporated by reference. The continuously variable transmission disclosed in U.S. Pat. No. 4,909,101 is adapted for concentric positioning around the axle of the driven wheel of a bicycle. However, it has been found that this design of continuously variable transmission can also be employed around the crank spindle, and when so employed, provides a compact unit of particular benefit in driving tandem bicycles in accordance with the present invention.

The continuously variable transmission unit disclosed in U.S. Pat. No. 4,909,101 is fully described therein, and the following will only describe basic functional assemblies and their arrangement in the present invention. Of course, it is to be understood that although the continuously variable transmission unit disclosed in U.S. Pat. No. 4,909,101 is particularly beneficial for use in the present invention, the present invention is not limited to use of that continuously variable transmission unit.

Each continuously variable transmission unit 30 includes a ratio multiplier assembly 4, a ratio control assembly 5 and a ratio multiplier assembly output hub 6, all depicted schematically in FIGS. 1 and 2. The input crank spindle 3 is journalled in the ratio multiplier assembly 4, the ratio control section 5 and in the end plate 12, all of which are preferably concentric with the crank spindle 3.

The output hub 6 of each continuously variable transmission unit 30 is suitably connected to an output drive hub including a sprocket 14 suitably journalled around input crank spindle 3. Drive sprockets 14, in turn, supply driving force to drive a common chain or belt 13 wrapped between them. A second sprocket 14' on the same hub as the rear sprocket 14 drives a final drive chain 13' leading to the drive wheel sprocket (not shown). It should be noted that the output hub 6 of the front continuously variable transmission unit 30 also includes a second sprocket 14'. However, this second sprocket has no chain wrapped around it and is not needed for the front transmission unit.

Since each output hub 6 is mechanically connected by its respective sprocket 14 to a common drive chain or belt 13, each rotates in a fixed relationship to the other. Of course, this fixed relationship is the same rotational speed if the sprockets 14 are of the same diameter, which is usually the case. However, the ratio control assembly 5 and the ratio multiplier 4 of each continuously variable transmission unit 30 (shown schematically in FIGS. 1 and 2) permit the speed ratio between each crank spindle 3 and its respective ratio multiplier assembly output hub 6 to be changed independently from the other, from its lowest ratio (which may be a direct drive) to any continuously variable output ratio of a chosen multiplier rate within the ratio multiplier assembly 4. Thus, each rider can adjust his/her pedalling rate independently of the other.

The ratio control assembly 5 is connected through transmission end plate 12 to the housing 8 and controls ratio of input to output speed. The ratio control assembly 5 for each continuously variable transmission unit is coupled to a manual twist-grip, lever or other similar device (not shown) on each rider's handle bar so that the rider can conveniently change his/her own pedalling speed ratio independent of the other rider.

Housing 8 is in effect an oversized pedal spindle housing, an integral part of the bicycle frame. Thus, each continuously variable transmission unit 30 is housed within its respective housing 8. This provides for compact positioning of the transmission units, allows the continuously variable transmission units to be conveniently sealed from contaminating elements, and permits the units to be easily removed, replaced or interchanged for maintenance or repair.

The frame of the tandem bicycle includes a bottom tube 15 which rigidly connects the transmission housings 8. Housings 8 are also welded or suitably affixed to the seat tubes 9 and the down tubes 10 of the bicycle frame to form a structure which is sufficiently strong and rigid for the drive system of the present invention.

The drive line assembly chain 13 is preferably enclosed in a chain housing 11 affixed to the transmission end plates 12, and wraps onto the drive sprockets 14 of each transmission. The openings in the chain housing 11 where the cranks 1 and 2 emerge are preferably protected from contamination by respective cover plates 7, which are affixed to and turn with their respective cranks.

In operation, each rider input into the drive line is made by pedalling an input force (torque) into his/her respective continuously variable transmission unit, the output of which is connected into the drive line sprocket at that pedal location. In this manner each rider is free to control his spinning rate and the amount of torque input, completely independent of the other rider(s). Each input may be changed at will while under load, coasting, or even at a stand-still, and may be varied with no direct relationship to the other rider(s), i.e., one rider can coast while the other rider(s) supply(ies) torque to drive the bicycle, etc. The drive line provides each rider(s) with the ability to ride the bicycle in any manner he/she wishes without having to be concerned with anything the other rider(s) is doing. Indeed, either rider can independently "coast" or pedal backwards at any time. Yet, because the lowest ratio of both or all of the transmissions is preferably the same, the riders may synchronize their pedals while "walking" up a steep hill where crank rotation should be synchronous for most efficient riding while standing up on the pedals. At any other time the pedalling is not synchronized or mechanically connected in any way between the riders except through the outputs to the drive line. As can be seen, the drive line at all times functions as a single drive line with two or more variable speed torque inputs from the transmissions around each respective input crank spindle.

Although the invention has been described in accordance with preferred embodiments, it will be seen by those skilled in the art that many modifications can be made within the sphere and scope of the present invention, and there is no intention to limit the scope of the present invention to solely these embodiments. Rather, the scope of the present invention is to be measured by the appended claims.

What is claimed is:

1. A multiple rider pedal driven vehicle comprising:
   a first pedal crank and crank spindle for a first rider,
   a first independently controllable continuously variable transmission mounted around said first crank spindle,
   a second pedal crank and crank spindle for a second rider, and
   a second independently controllable continuously variable transmission mounted around said second crank spindle,
   each of said first and second independently controllable continuously variable transmissions being mechanically coupled together by a common drive line and the common drive line including an output mechanically coupled to a drive wheel each independently controllable continuously variable transmission providing independent adjustment of the speed ratio of the crank spindle relative to the common drive line.

2. The multiple rider pedal driven vehicle defined in claim 1, wherein said first continuously variable transmission includes an output sprocket and said second continuously variable transmission includes an input sprocket and an output sprocket mounted on a common output hub, said output sprocket of said first continuously variable transmission and said input sprocket of said common hub of said second continuously variable transmission being mechanically coupled by an intermediate drive chain or belt, said output sprocket of said common output hub of said second continuously variable transmission driving a final drive chain or belt mechanically coupled to said drive wheel.

3. The multiple rider pedal driven vehicle defined in claim 1, wherein said vehicle includes a frame including an enlarged crank spindle housing for each crank spindle, each of said continuously variable transmissions being mounted within one of said enlarged crank spindle housings.

* * * * *